(12) United States Patent
Ndu et al.

(10) Patent No.: US 11,803,639 B2
(45) Date of Patent: *Oct. 31, 2023

(54) MEASURING INTEGRITY OF COMPUTING SYSTEM USING JUMP TABLE

(71) Applicant: Hewlett Packard Enterprise Development LP, Houston, TX (US)

(72) Inventors: Geoffrey Ndu, Bristol (GB); Theofrastos Koulouris, Bristol (GB); Nigel Edwards, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 267 days.

This patent is subject to a terminal disclaimer.

(21) Appl. No.: 17/232,264

(22) Filed: Apr. 16, 2021

(65) Prior Publication Data

US 2021/0256118 A1 Aug. 19, 2021

Related U.S. Application Data

(63) Continuation of application No. 16/007,683, filed on Jun. 13, 2018, now Pat. No. 11,017,080.

(51) Int. Cl.
*G06F 21/00* (2013.01)
*G06F 21/55* (2013.01)

(52) U.S. Cl.
CPC .......... *G06F 21/554* (2013.01); *G06F 21/552* (2013.01); *G06F 2221/034* (2013.01)

(58) Field of Classification Search
CPC .. G06F 21/52; G06F 2221/034; G06F 21/552; G06F 21/57; G06F 21/554
See application file for complete search history.

(56) References Cited

U.S. PATENT DOCUMENTS

| 8,326,579 | B2 | 12/2012 | Wilson et al. |
| 9,177,153 | B1 | 11/2015 | Perrig et al. |
| 9,390,260 | B2 * | 7/2016 | Tan .................... G06F 9/45516 |

(Continued)

OTHER PUBLICATIONS

Ahmed, I. et al., "ModChecker: Kernel Module integrity Checking in the Cloud Environment," 2012, 8 pages, https://pdfs.semanticscholar.org/d80c/1b29e85e0ad720970959abfa37ffbf314073.pdf.

(Continued)

*Primary Examiner* — Tri M Tran
(74) *Attorney, Agent, or Firm* — Trop, Pruner & Hu, P.C.

(57) ABSTRACT

Examples disclosed herein relate to integrity monitoring of a computing system using a kernel that can update its own code. Trust of state information is verified. Kernel code and module code are loaded into memory that is accessible to a device separate from a processor that loads the kernel code and module code. A measurement module is verified and loaded into memory. The state information can correspond to multiple symbols. The measurement module can measure the state information corresponding to each of the respective symbols to generate a set of initial measurements. The set of initial measurements can be provided to a device for integrity monitoring. The device is to compare a current measurement with an initial measurement to determine if a potential violation occurred. The device is to use a representation of a jump table to determine whether the potential violation is a violation.

16 Claims, 7 Drawing Sheets

(56) References Cited

U.S. PATENT DOCUMENTS

| | | | |
|---|---|---|---|
| 2006/0195906 A1* | 8/2006 | Jin | H04L 9/3236 |
| | | | 726/28 |
| 2006/0277539 A1* | 12/2006 | Amarasinghe | G06F 21/54 |
| | | | 717/168 |
| 2006/0294592 A1* | 12/2006 | Polyakov | G06F 21/566 |
| | | | 726/24 |
| 2011/0276829 A1 | 11/2011 | Peng et al. | |
| 2017/0213039 A1 | 7/2017 | Werner et al. | |

OTHER PUBLICATIONS

Janson Baron, "static-keys.txt", Static Keys, available online at <https://lwn.net/Articles/487426/>, 2012, 5 pages.

Petroni et al., "Property-Based Integrity Monitoring of Operating System Kernels", 2008, 148 pages.

Wikipedia, "NOP", available online at <https://en.wikipedia.org/w/index.php?title=NOP&oldid=837665245>, Apr. 22, 2018, 1 page.

Wikipedia, "Red-black tree", available online at <https://en.wikipedia.org/w/index.php?title=Red%E2%80%93black_tree&oldid=836772731>, Apr. 16, 2018, 18 pages.

* cited by examiner

```
[+0.000003] target: 0xffffffff81209100 key: hugetlb_cgrp_subsys_on_dfl_key+0x20/0x20 code: 0xffffffff812090b5 patch: 0f-1f-44-00-00

[+0.000004] target: 0xffffffff81200efe key: devices_cgrp_subsys_enabled_key+0x20/0x20 code: 0xffffffff81200ee9 patch: e9-10-00-00-00
```

FIG. 6

MEASURING INTEGRITY OF COMPUTING SYSTEM USING JUMP TABLE

CROSS-REFERENCE TO RELATED APPLICATION

This application is a Continuation of U.S. application Ser. No. 16/007,683, filed on Jun. 13, 2018, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

Computing devices and systems may utilize runtime integrity software to detect malicious programs. The runtime integrity software may execute in the same space as the components that are monitored, thus potentially exposing the runtime integrity software to the same risks posed by the malicious programs.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Computing devices may utilize runtime integrity software to detect malicious programs. The runtime integrity software may execute in the same space as the components that are monitored, thus potentially exposing the runtime integrity software to the same risks posed by the malicious programs.

A broad class of cyber security attacks involve an adversary injecting code or changing read-only data. These attacks can be detected and remedial action taken as critical parts of a production kernel should not change or only change in predictable manner once a kernel reaches "steady state". One example of a kernel or module that changes in a predictable manner is a kernel/module that is self-modifying. For example, the kernel/module may update or patch its own code at runtime. This can make it difficult for an external entity performing integrity monitoring to differentiate between legitimate and illegitimate updates to the kernel/module. Legitimate code patching may occur for a number of reasons including: processor optimizations, multiprocessor compatibility adjustments, bug fixes, container features, advanced debugging, etc.

Most practical solutions for detecting code and data injection attacks are based on Virtual Machine Introspection (VMI). VMI is a technique that leverages the hypervisor to monitor the runtime state of a system-level virtual machine (VM) with the aim of detecting and preventing unauthorized changes to guest OS. However, VMI has a number of disadvantages, for example, a large overhead on resources, use of hypervisors and virtual machines, and challenges of protecting the hypervisor itself.

Various examples described herein include a lightweight approach to kernel monitoring that uses a device such as a Baseboard Management Controller (BMC) or another device that includes a processor outside of a host domain of a computing system to continually monitor critical kernel code regions and data structures. The device can take remedial action such as shutting down the computing system, logging issues, sending out alert messages, etc. when tampering is detected. The approaches described can advantageously monitor kernels including operating systems and hypervisor kernels.

Runtime code patching breaks the static approach to integrity monitoring: measuring (hashing with a suitable hashing algorithm) kernel code just after initialization and continually re-measuring from the external entity, expecting no changes. Accordingly, various examples described herein describe a technique that an external entity, for example, a device, can use to verify the integrity of runtime code updates (e.g., a self-modifying kernel or module code). Techniques described can be used, for example, on static key patching mechanisms used in various operating systems and hypervisors such as the Linux kernel.

When the device monitors the critical kernel code regions and data structures, if there is a mismatch in measurements, the device can look to a representation of a jump table. The jump table representation can be used to determine if an address that is expected to be used for an update is modified. If changes to the code are associated with update locations and are validly updated, there is not a violation to the integrity of the kernel and/or module.

Additionally, the approaches can focus on the general effects of attacks and not specific signatures, thus the approaches can be particularly effective against attacks that use new techniques and previously unknown vulnerabilities that circumvent other defenses. Example approaches involve using a cryptographic hashing algorithm to measure and subsequently detect unauthorized changes to a kernel and/or other modules loaded.

Figure 1A:
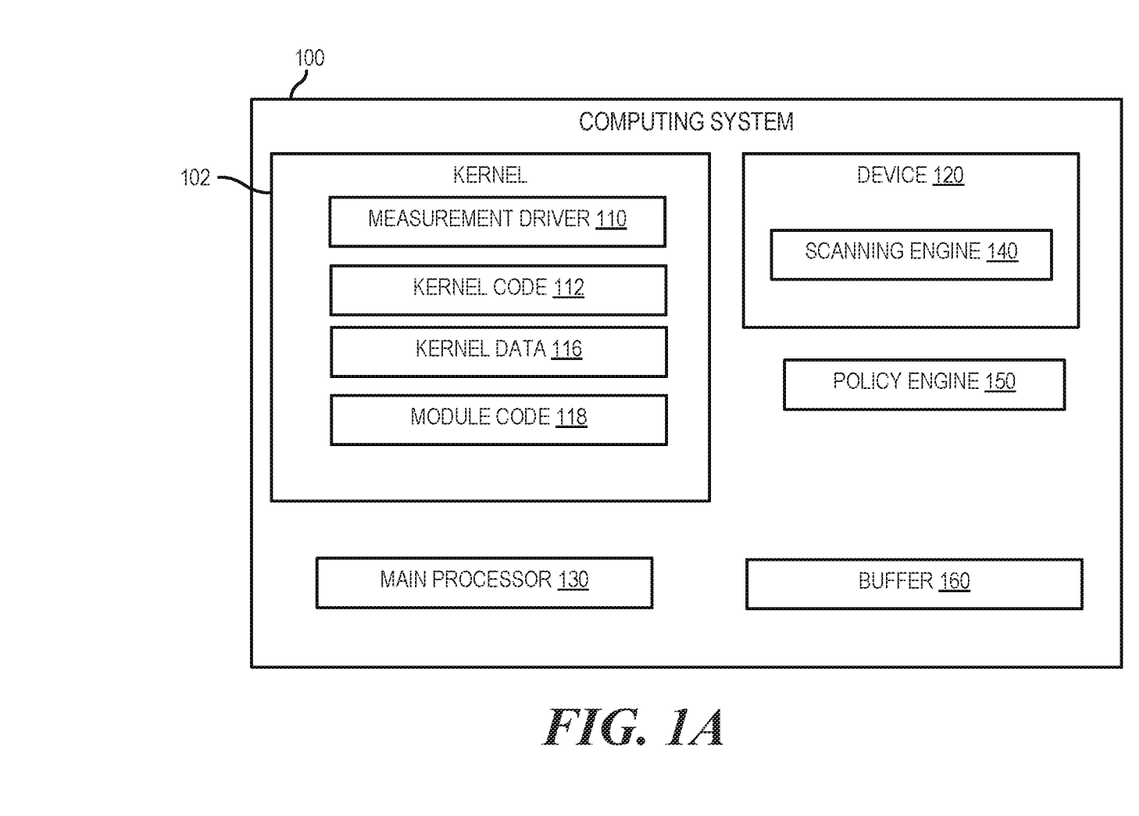
FIG. 1A is a block diagram of a computing system capable of measuring integrity using a device, according to an example.

FIG. 1A is a block diagram of a computing system capable of measuring integrity using a device, according to an example. FIGS. 1B, 1C, 1D, and 1E are diagrams of static key code snippets, according to various examples. The computing system 100 of FIG. 1A can load a kernel 102 into memory. The computing system can include a main processor 130 as well as a separate device 120 that shares access to memory that is used to load the kernel 102. The kernel 102 can include a measurement driver 110, kernel code 112, kernel data 116, and module code 118. The device 120 can include a scanning engine 140 and a policy engine 150.

FIGS. 1B, 1C, 1D, and 1E are diagrams of static key code snippets, according to various examples. The static key mechanism is often employed in kernels to enable rarely-used features when the features are actually needed at run-time. As a result, code for rarely used features have minimal impact when not in use. Static keys enable runtime branching to kernel code for rarely used features, by swapping (patching) a NOP instruction with a JUMP to the rarely used feature code. A NOP instruction is an instruction with a well-defined number of clock cycles to execute and whose explicit purpose is to not change the state of any of the programmer-accessible registers, status flags, or memory. The JUMP instruction is restored back to a NOP when the feature is disabled. Since this branching is static it outperforms the use of conditional branching.

Figure 1B:
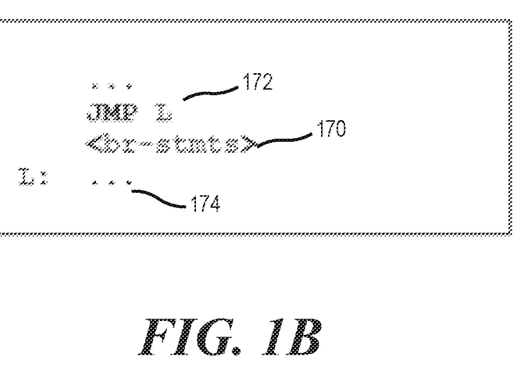
FIGS. 1B, 1C, 1D, 1E are diagrams of static key code snippets, according to various examples.

FIG. 1B shows a static key code snippet before patching. At compile time, code is emitted such that code <br-stmts> 170 are not executed as JMP L 172 makes execution skip to L: 174 without executing <br-stmts> 170.

Figure 1C:
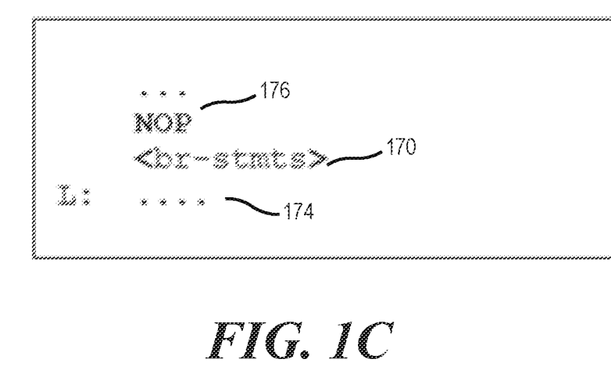

As shown in FIG. 1C, assuming at runtime a user enables a feature that uses <br-stmts> 170 code, the kernel patches JMP L to NOP which now leads to the execution of <br-stmts> 170, the feature code. When the user disables the feature, the kernel patches NOP 176 back to JMP 172 disabling <br-stmts> 174 once more. Similarly, code may also start off as shown in FIG. 1C and get patched at runtime to code in FIG. 1B.

Figure 1D:
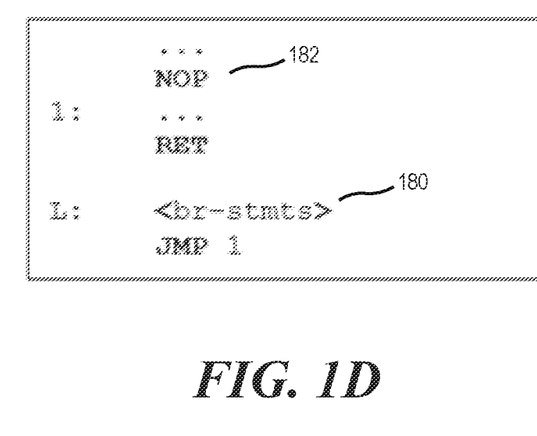
Figure 1E:
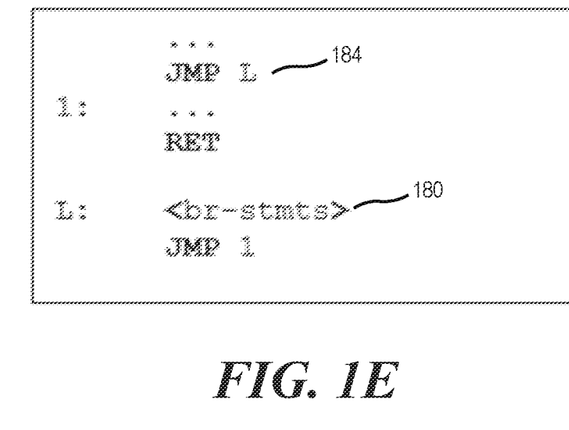

Another style of static key code is illustrated in the FIGS. 1D and 1E. The principles of operation is the same as described previously and <br-stmts> 180 refers to the code to be used (e.g., rarely used code). In FIG. 1D, execution skips all the code starting at L: <br-stmts> until patched as shown in FIG. 1E. A code sequence can start off as shown in FIG. 1E and get patched at runtime to code shown in FIG. 1D.

In some examples, static key patching is implemented with the help of a jump table. A jump table is a data structure that allows a kernel to identify locations to patch at runtime. An example entry in a jump table is shown in Table 1.

TABLE 1

| Field | Description |
| --- | --- |
| code | Address in memory of the instruction that will be patched at runtime. This, for example, will be the address of JMP L 172 instruction in FIG. 1B or NOP 176 in FIG. 1C. |
| target | The destination address to jump to when a JMP instruction is patched in. It will be the address of the line that starts with "L:" in FIGs. 1A, 1B, 1C, and 1D. This address can be stored encoded and the encoding may vary from one processor architecture to another. |
| key | This is the address of the static key that is related to this particular entry in the jump table. |

The kernel associates particular code (e.g., rarely used features) with static keys. As used herein, a "static key" is a data structure that the kernel or module uses to track and manage runtime code updates. The static key contains information such as type of branch (e.g. a FIG. 1B vs FIG. 1D type branch) and initial state (e.g. NOP or JMP L initial branch). Features are mapped to associated static keys at compile time.

In one example, assuming a user requests that the kernel turn on a feature mapped to a particular static key, the kernel looks up the address of the static key and searches the key field of each entry in the jump table for matches. For each match, the kernel uses the information in the key and jump table to patch the code accordingly. There may be multiple entries in a jump table for each static key.

The measurement driver 110 can run in the kernel 102 of an operating system (OS) or hypervisor. The measurement driver 110 identifies and measures the parts of the kernel 102 that should not change (or only change in a predictable manner) once the kernel reaches a steady state. Each critical kernel part measured is referred to as a "symbol." As used herein, a "symbol" is an area of the memory that is measured. A symbol can be identified using an identifier and may be associated with an address and an offset. As used herein, a "driver" is a type of computer program that can be executed to operate or control a particular type of device on the computing system, for example provide information to the scanning engine 140. The measurement driver 110 identifies symbols and passes their physical address and measurement (e.g., a hash digest) to the scanning engine 140 which runs on the device 120. The scanning engine 140 can continually re-measure those kernel parts (symbols) and can take remedial action based on a policy set by a customer in the policy engine 150. Continually re-measuring can mean re-measuring based on a trigger (e.g., a counter), according to a schedule, periodic, etc. Thus, the re-measuring can be regular. Moreover, the re-measuring can be frequent. The policy engine 150 could live in the device 120 (e.g., a BMC), or be hosted elsewhere, like in a centralized management console configured to receive out of band alerts from a device such as a BMC. Examples of policies that can be taken in response to a violation of integrity include logging information, sending an alert to an operator, enforcement of a policy such as shut down of the computing system 100, recovery of the computing system, using, for example, a re-image from a golden copy of a kernel, etc.

In some examples, the device 120 and the measurement driver 110 can communicate using a buffer 160 on the device 120 that is mapped into the main processor 130 using a system interconnect (e.g., a Peripheral Component Interconnect Express (PCIe)). Communications can use a pre-agreed format. In one example, communications can include, a packet header, a symbol name, an address, a size of the symbol, a hash digest, and/or padding.

When the computing system 100 boots, the boot process of a kernel 102 is modified to load and run the measurement driver 110 just after it finishes loading the basic kernel modules/drivers. Integrity verification, such as secure boot (or measured boot) can be used to ensure that safe, verified, and authorized modules or drivers run before the measurement driver 110. This can help ensure that the measurement driver 110 measures an untampered kernel.

With secure boot, the measurement driver 110 is signed by a private key whose public key is enrolled in one firmware's trusted key databases. A trusted key database contains the trusted (public) keys/certificates used for authenticating any applications or drivers executed in the firmware environment (e.g., a Unified Extensible Firmware Interface (UEFI), basic input output system (BIOS), etc.) and/or in kernel environments.

In one example secure boot chain of trust, firmware verifies that the bootloader is signed with a key in one of the trusted key database. The bootloader boots the kernel code 112 and kernel data 116 after verifying the kernel is signed properly with a trusted key. The kernel verifies and loads a set of the basic modules/drivers (e.g., module code 118 and/or associated module data) needed on the system. Each module/driver is signed by a trusted key. The kernel now verifies and loads the measurement driver 110. The measurement driver 110 now identifies and measures the critical parts (symbols) of the kernel. It informs the device 120 of the physical address, size and the expected hash digest of symbols so that the device 120 can then initiate the continual monitoring of the critical parts. The kernel loads other kernel modules/drivers and initializes user mode processes.

Measured boot is similar to the secure boot process. A difference is that prior to launching the next stage of the boot process, the currently-running stage "measures" (computes the hash) of the code of the next stage(s) in the chain, and stores the hashes in a way that they can be securely retrieved later to find out what code were encountered.

Once the measurement driver 110 is loaded, it hooks into the code that is used by the kernel to load modules and drivers. Hence, it can measure and monitor (and prevent) subsequent (un)loading of modules and drivers.

The measurement driver 110 can measure critical parts of a kernel 102 such as kernel code 112, kernel data 116 such as kernel read only data, code and read only data of modules and/or drivers such as module code 118, architectural entry points such as a interrupt descriptor table, input output memory management unit (IOMMU) tables, system call tables, structures that store information on processes, jump tables containing pointers to executable code, etc. The measurement driver 110 can also measure itself to enable the scanning engine 140 to be able to detect when an adversary tampers with the driver or tries to unload the driver.

In some examples, the device 120 may write or send the measurements to a second device, for example to a central monitoring station or security information and event management framework. In some examples, the measurements may then be used for auditing and forensic analysis. In some examples, the device 120 can send a snapshot of the critical parts (e.g., symbols) to the SIEM framework after verifying hashes. For example, as part of a security action, when a violation is found, snapshots of the critical parts with hashes that don't match a baseline measurement can be provided to the SIEM framework for analysis on potential new attack types.

A SIEM is an approach to security management that uses information and events to identify threats and take an appropriate action. In some examples, the SIEM aggregates relevant data from multiple sources and identifies deviations from a normal state. The SIEM system can be a rules-based system or correlation engine to establish relationships between information and events. In some examples, when a SIEM receives information from the device, the SIEM can analyze activity that may have led to the violation and begin to look at whether other computing systems may have been affected and if so, perform a remedial action.

To measure the specified symbols, the machine-readable instructions to perform such measurements (whether in the kernel or in the device (e.g., BMC)) may use an address in memory identifying the symbol and the size of the space to be measured. In some examples, symbols can represent portions of code such as one or multiple functions. Functions may be grouped at a particular section or sections of memory addresses (the section or sections identified by a starting memory address and an offset or a set of addresses). As noted previously, the areas being measured may be static or may change to an expected or predictable manner. Once ready to be measured, the measurement driver 110 may pass the starting address of the symbols and an offset or the starting and ending the symbols to a buffer 160 (or some designated memory location) accessible by the device 120.

Thus, the device 120 may obtain the addresses of the specified symbols to be measured.

In some examples, the measurement driver 110 may be OS specific. The measurement driver 110 may include the addresses (or a starting address and an offset) that identify the specified kernel space. Further, the driver may include a set of addresses and expected measurements (e.g., hash values) corresponding to each address of the set of addresses.

The measurement driver 110 can also be used to traverse over each of the entries of a jump table and record the entries in an appropriate data structure. In some examples, inbuilt kernel functions/mechanisms can be used, such as kallsyms_lookup_name( ) in Linux, to find the beginning and end of the jump table in a kernel. As the jump table is traversed, each jump table entry is inserted into the data structure (e.g., a red-black tree) or similar data structure that allows for efficient in-order traversal. The red-black tree is set up to allow for the efficient in-order traversal of the jump table entries based on kernel code (or module code) patch locations i.e. the red-black tree is "sorted" based on the code field of jump table entries. In some examples, other less efficient data structures can be used. After constructing the red-black tree, the nodes are serialized and sent them over to the scanning engine 140. In one example, the red-black tree is serialized by performing a depth-first, left-to-right traversal of the nodes. At the scanning engine 140, the red-black tree is reserialized (e.g., reconstructed). The scanning engine 140 can use the red-black tree to verify whether a change in code is legal when a baseline and current measurement do not match. Other approaches can be used to provide the data structure to the scanning engine 140.

The scanning engine 140, which runs on the device 120 is primarily responsible for the continual scanning of the critical parts of the kernel, for example, the measurement driver 110, the kernel code 112, kernel data 116, module code 118, etc. The scanning engine 140 can use Direct Memory Access (DMA) or similar technology to access the system memory where the kernel is running. The device 120 has access to host physical memory, and can compare ranges of memory to the known hashes. Because the scanning engine 140 knows the location of the respective symbols and the size of the respective symbols, the scanning engine 140 is able to perform the same hash algorithm on the memory location and compare that hash with the previously taken measurements. If one of the memory locations associated with a symbol does not match the expected hash, it is considered a potential violation. This potential violation can be checked against a representation of the jump table (e.g., the red-black tree) to confirm whether the potential violation is a violation. A violation is communicated to the policy engine 150.

The policy engine 150 is used to set what action to take when a violation occurs. As noted above, in a static implementation, a violation is whenever a symbol's initial measurement or hash deviates from the measurement or hash generated from the current measurement of the respective symbol. In an implementation with self-modifying code, the deviation can be considered a potential violation that can be confirmed using a jump table representation. Once a violation is detected by the scanning engine 140 it can signal the policy engine 150 which then takes an action. The action can be preset. Example actions include logging the violation in a system log, sending an alert to an operator, enforcement such as a shutdown of the system, recovery including reinstallation of the kernel from a golden image (e.g., an image stored on a central server).

The engines 140, 150 include hardware and/or combinations of hardware and programming to perform functions provided herein. Moreover, the modules can include programing functions and/or combinations of programming functions to be executed by hardware as provided herein. In some examples, a driver may be implemented as a specialized module that is capable of control/communication of a particular hardware on the computing system 100.

Figure 2:
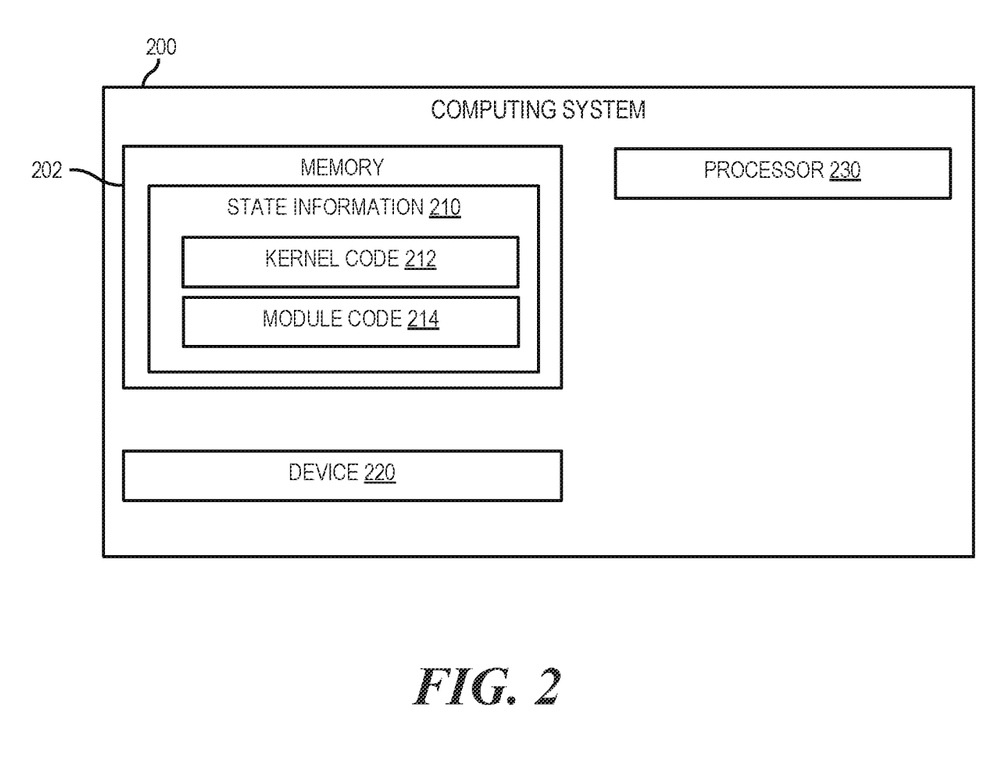
FIGS. 2 and 3 are block diagrams of computing systems capable of runtime integrity measurement, according to various examples.
Figure 3:
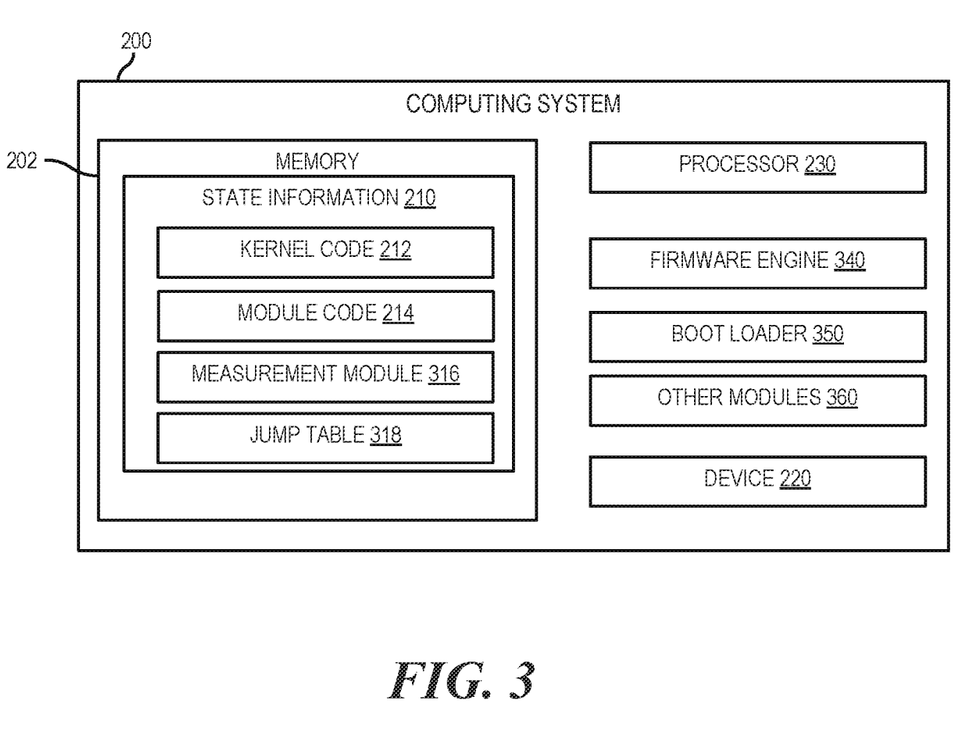
Figure 4:
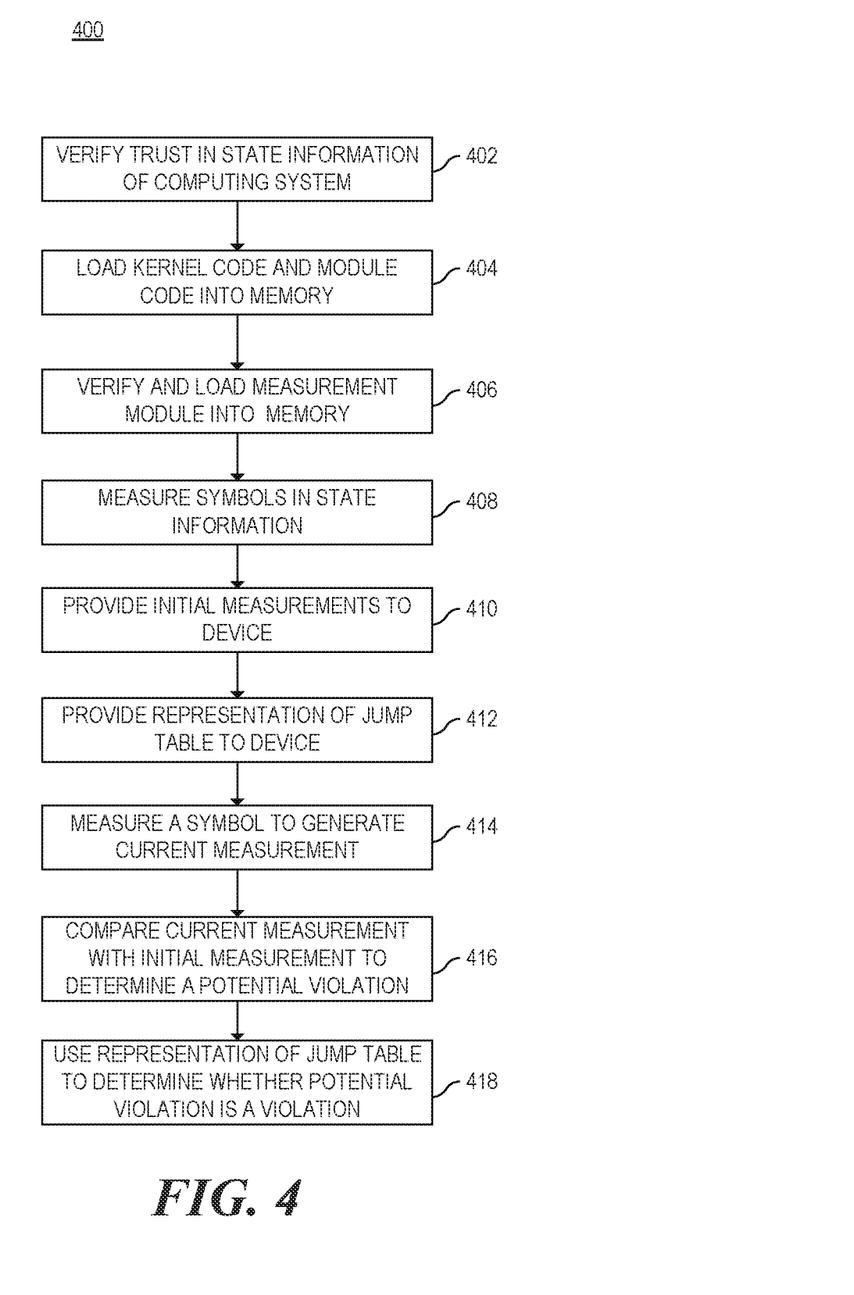
FIG. 4 is a flowchart of a method for runtime integrity measurement, according to an example.

FIGS. 2 and 3 are block diagrams of computing systems capable of runtime integrity measurement, according to various examples. FIG. 4 is a flowchart of a method for runtime integrity measurement, according to an example. Computing system 200 can include memory 202 that includes state information 210 that is loaded by at least one main processor 230 of the computing system. The state information can include kernel code 212, module code 214, a measurement module 316. Similarly, other modules can be loaded into the memory 202. As noted, the computing system 200 can be booted by one or more firmware engine 340 and the boot process can be turned over to a boot loader 350. In some examples, the kernel code 212 can be loaded by the boot loader 250 along with kernel data, the module code 214, the measurement module 316, a jump table 318, etc.

As used herein, a "computing system" may be a storage array, storage device, storage enclosure, server, desktop or laptop computer, computer cluster, node, partition, or any other device or equipment including a controller, a processing resource, or the like that can include a device 220 separate from the processor 230 that can be used for measuring the memory 202 as described herein. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof. As used herein, the processor or set of processors 230 that load and are intended to execute the operating system (e.g., kernel) is separate from the device 220.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, a "device" 220 may be any microcontroller, BMC, circuit, CPU, microprocessor, GPU, FPGA, chassis manager, rack level manager, server, TPM, other electronic circuitry suitable to measure data structures in memory, or a combination thereof. For example, the device 220 may be a BMC of a server. In another example, the device 220 may be a top of rack switch or management module. In such examples, the device 220 may operate independently of each system within the racks OSes. In such examples, the device 220 may take the measurements of each systems kernel space in each systems memory.

As used herein, a "Baseboard Management Controller" or "BMC" is a specialized service processor that monitors the physical state of a server or other hardware using sensors and communicates with a management system through an independent "out-of-band" connection. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware devices located in a server chassis including system memory. The BMC may be able to directly modify the hardware devices. The BMC may operate independently of the OS of the system that the BMC is located in. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for sub-systems of a computing device, and is separate from a processing resource that executes an OS of a computing device. The BMC is separate from a processor, such as a central processing unit, executing a high level OS or hypervisor on a system.

As used herein, an "operating system" or "OS" is machine-readable instructions that may be stored in a machine-readable storage medium and executed by a processing resource. An OS may include system software that manages computer hardware and software resources, as well as providing common services for computer programs. The OS may facilitate communications between a computing devices hardware and applications. The OS may include a user interface that allows a user to interact with the computing device. The OS may include layers, such as an application layer and a kernel layer. High level applications (as in, applications that a user may interact with) may execute at the application layer of an OS, while the kernel layer may include machine-readable instructions that control the computing devices hardware. During the setup or initialization of a computing device, an OS may be installed. During a computing devices boot or start-up process, the OS is loaded into a machine-readable storage medium. As noted above, a processor or processing resource of the computing device may execute the OS from the machine-readable storage medium.

As used herein, a "kernel" may be a part of the OS. The kernel may be the part of the OS that provides the most basic level of control over all of the computer's hardware devices. The kernel may manage memory accesses, allot hardware resources, manage the processing resources operating states, and manage data. In one example, the OS may include a kernel that is static. In other examples, the OS may be dynamic, but known static parts can be measured. In further examples, the kernel may be self-modifying, for example, using the help of a jump table.

A kernel space may be a part of a virtual memory of a computing device. The virtual memory may map virtual addresses of a program into physical addresses in computer memory of computing device, such as a machine-readable storage medium or other memory device. A processor of the computing device may segregate the virtual memory of the computing device into the kernel space and a user space. For example, the kernel space may be reserved for running the kernel, kernel extensions, and device drivers. The user space, in contrast, may be the memory area where applications and services are executed.

As used herein, a "cryptographic hash function" may be a function comprising machine-readable instructions. The cryptographic hash function may include machine-readable instructions that, when executed by a processor, may receive an input. The cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

As used herein, a "Root of Trust device" or RoT device may be a device that behaves in an expected manner, as the RoT devices misbehavior may not be detectable. In other words, the RoT device may be inherently trusted software, hardware, or some combination thereof. A RoT device may include compute engines. The compute engine may be software operating using hardware in the RoT device, hardware of the RoT device, or some combination thereof. For example, a RoT device may include a Root of Trust for Storage (RTS). The RTS may be a compute engine capable of maintain an accurate summary of values. For example, the RoT may be a TPM. In such examples, the TPM may include a platform configuration register (PCR) (or a plurality of PCRs). Further, the RTS may be a PCR (or a plurality of PCRs). In another example, the RoT may include a Root of Trust for Reporting (RTR). The RTR may be a compute engine capable of sending requested information to a requesting device. The information may include the contents in a register of the RoT (or the contents of the RTS) and information specified by the requester. The RoT may include other compute engines not described here, such as a compute engine to measure specified values or a compute engine to authenticate.

As used herein, a "trusted platform module" or "TPM" may be an integrated circuit built into a motherboard of a computing system. The TPM may be tamper resistant or tamper proof. The TPM may be utilized for services on the computing system. The services may include device identification, authentication, encryption, measurement, determine device integrity, secure generation of cryptographic keys, remote attestation, and sealed storage. The TPM may include platform configuration registers. The PCRs may store security relevant metrics. Machine-readable instructions (such as a kernel) or devices may extend the PCR with data. To extend a PCR with a measurement, the machine readable instructions or device extending the PCR may send a new value to the TPM. The TPM may take a hash of the new value and the current value in the PCR. The TPM may store the result in the PCR.

As used herein, a "buffer" may be a region of memory to be utilized for storing data temporarily, while the data is moved from one location to another. The buffer may be a fixed size or a variable size. The buffer may be located in the machine-readable storage medium of the system. Further, the buffer may be located in the memory of the system.

As used herein, an "agent" may be an application program, in other words, machine-readable instructions. The agent may be installed on the system or a device of the system. The agent may operate in a machine-readable storage medium. For example, an agent may reside in the machine-readable storage medium of a BMC or of a system. The agent may communicate through a representational state transfer (REST) application program interface (API), IOCTL interfaces, or some other communication method with other devices or software. For example, an agent may reside in the machine-readable storage medium of a BMC and communicate with an OS through an IOCTL interface.

Although execution of method 400 is described below with reference to computing system 200, other suitable components for execution of method 400 can be utilized (e.g., computing system 100). Additionally, the components for executing the method 400 may be spread among multiple devices. Method 400 may be implemented in the form of executable instructions stored on a machine-readable storage medium, and/or in the form of electronic circuitry.

Method 400 can begin at 402, where trust in state information of a computing system is verified. In one example, the state information includes at least the kernel code 212 and module code 214, for example, module code and/or drivers used in basic operation of the computing system 200. In other examples, the state information 210 can also include a jump table 318. In one example, trust can be verified using a chain. For example, when the computing system 200 is initialized, firmware engine 340 can verify a boot loader 350, for example, by using a key. The boot loader 350 can boot the kernel code 212 after verifying the kernel code is signed using a second trusted key. The kernel then verifies module code 214 for loading using a third trusted key. The trusted keys can be the same key or a different key and be stored in a trusted location (e.g., at a BMC, at the device 220, at a TPM, etc.). This can be implemented using a secure boot. In other examples, verification may be enabled using a measured boot approach.

At 404, the processor 230 can load the kernel code 212 and module code 214 into memory 202. Similarly, the jump table can be loaded as described above. The memory 202 can be accessible by the device 220, which is separate from the processor 230. At 406, the measurement module 316 can be verified and loaded into the memory 202.

The state information 210 can correspond to multiple symbols. The symbols can each be associated with a section of memory. The symbols can be used identify sections of the memory, for example, particular functions associated with code, tables, etc. The measurement module 316 can be configured for the particular kernel code, module code, and other state information that is loaded to know what symbols to track. The measurement module 316 can further be configured to use kernel code to determine various information about the symbols, for example, the size of the symbol, a start of the symbol, an end of the symbol, a start of a next expected symbol, etc. Different kernel codes may have different functions to enable gathering of the information. The information can be used to determine a start address of each of the symbols and a size of the symbol.

At 408, the measurement module 316 can measure the state information 210 before a set of other modules 360 are loaded. The state information 210 corresponding to each of the symbols can be used to generate a set of initial measurements. In one example, the measurement module 316 can measure the corresponding state information for each symbol. The measurement module 316 or other agent can then provide the set of initial measurements associated with the respective symbols to the device 220 for integrity monitoring (410). The providing of the information can be via a buffer and/or interconnect as described above or some other communication method that is accessible to the device 220 and initialized kernel. The state information 210 for the symbols measured at this time can be in a steady state, where it is not expected for the information to change or if it does change, the information is to change in a particular way, for example, tracked using the jump table 318. In FIGS. 2 and 3 state information 210 is shown as a box around particular examples of information that may include symbols for explanatory purposes. As used herein "state information" is a set of data corresponding to respective symbols that are not expected to change state after measurement or if it is changed, it changes in an expected manner. If the code being analyzed is static and there is a change in the information, it can be considered an integrity violation, which may indicate malicious intent. If the kernel or module can be patched at runtime, approaches can be used to verify that a potential violation is actually a violation using a representation of a jump table.

A representation of the jump table 318 can be created using the measurement module 316. The measurement module 316 can be used to traverse over each of the entries of a jump table and record the entries in an appropriate data structure. In some examples, inbuilt kernel functions and/or mechanisms can be used, such as kallsyms_lookup_name( ) in Linux, to find the beginning and end of the jump table in a kernel. Further, in some examples, when a module is loaded that can be modified, a jump table for the particular module can be similarly traversed using similar mechanisms. As the jump table is traversed, each jump table entry is inserted into the data structure (e.g., a red-black tree) or similar data structure that allows for efficient in-order traversal. The red-black tree can be set up to allow for the efficient in-order traversal of the jump table entries based on kernel code (or module code) patch locations i.e. the red-black is "sorted" based on the code field of jump table entries. In some examples, other less efficient data structures can be used. After constructing the red-black tree, the nodes are serialized and sent over to the device 220. Thus, at 412, a representation of the jump table can be sent to the device 220. In one example, the red-black tree is serialized by performing a depth-first, left-to-right traversal of the nodes. At the device 220, the red-black tree is reserialized (e.g., reconstructed). Other approaches can be used to provide the data structure to the device 220. The device 220 can use the representation of the jump table (e.g., the data structure or red-black tree) to verify whether a change in code is legal when a baseline and current measurement do not match.

In one example, the device 220 can keep a copy of the state information 210 to determine whether a modification is legal during runtime. The copy of the state information 210 (e.g., kernel code 212) serves as reference for determining if an update is legitimate. In one example, a reference copy of the state information 210 can be divided to correspond to one or more particular symbols. The reference copy can be taken at a time coinciding with the device receiving the initial measurements for a particular symbol.

In another example, for example, when there is limited storage space at the device 220, hashes can be taken one block at a time. This approach is detailed further below.

As noted above, the initial measurements can include hashes of the respective state information associated with the corresponding symbols. In some examples, a message communicated between the measurement module 316 and the device may include a packet header, a symbol name, an address, a size of the symbol, and a hash digest generated from a cryptographic hash algorithm with the information stored from the address for the size. In some examples, padding can be added to a message to facilitate simple communications. Thus, in some examples, the initial measurements can include a location of each respective symbol being tracked in the memory and a size of the respective state information associated with the particular symbol.

In some examples, once the measurement module 316 is loaded, the measurement module 316 will hook into a function (or multiple functions) in the kernel code responsible for loading other modules 360. This can occur before baseline measurements are taken. When the other modules 360 are loaded, symbols associated with the other modules 360 can be measured using a similar approach as described herein. Thus, respective baseline measurements associated with other state information associated with each of the other symbols can be measured. The baseline measurements for the other symbols can be sent to the device 220. Similarly, when these other modules have self-modifying code enabled, a jump table for the module can be traversed and a representation of the jump table can be provided to the device 220. The device can then monitor the module in a similar approach or the same approach as described herein.

The device 220 can monitor the respective state information in the memory 202 associated with each of the symbols for which an initial or baseline measurement was taken (414). The monitoring can be performed by measuring, by the device 220, the state information corresponding to each of the symbols to determine a second set of measurements for the respective symbols. The device 220 can compare the second set of measurements with the initial or baseline measurements. The comparison can be one at a time (e.g., a current measurement of one symbol compared to the baseline or initial measurement for that symbol).

For ease of explanation, monitoring of a single symbol is described, however, it is intended that the same approach can be used to monitor multiple symbols of the state information. Accordingly, the device 220 can measure a first one of the symbols after the set of initial measurements are taken to generate a current measurement for that symbol.

At 416, the current measurement and the initial measurement are compared. In some examples, the device 220 determines that there is a potential violation based on the comparison. This can occur if the comparison of two measurements for a symbol does not match. In a system where the state information 210 can be updated, the device 220 can use the representation of the jump table to determine whether the potential violation is a violation.

In one example, a reference copy of the state information 210, for example, a portion of the state information 210 corresponding to the symbol can be compared with the current information in the memory location associated with the symbol. The comparison can be used to determine where the reference copy does not match the current information, for example, at an address. In some examples, portions of the reference information can be compared to corresponding portions of the current information at a particular size at a time (e.g., the size of a NOP). In other examples, a function can be used to identify locations (e.g., one or more address) of differences between the reference information and current information. The representation of the jump table can be used to determine whether the identified address is a valid patch site. As used herein, a patch site is a location that is intended to have potential to be updated. An example from FIGS. 1B and 1C is the address associated with JMP L 172 and NOP 176. Another example is the location of NOP 182 and JMP L 184 from the examples of FIGS. 1D and 1E. In some examples, addresses of patch sites can be kept in the representation along with the current instruction expected to be at the patch site and possible alternatives (e.g., a NOP or jump location) for the current instruction.

If the address associated with a mismatch is not a valid patch site, the potential violation can be considered a violation. In this case, a security action is initiated. A security action can be performed in response to the determination of the violation. As noted above, the security action can include one or more of logging of the violation, sending an alert of the violation, shutting down of the computing system 200, re-initializing of the computing system, or other pre-determined action to remediate upon detection of the violation.

In one example, the representation is a red-black tree and one or multiple valid potential instructions are included in the red-black tree for the patch site. In some examples, the symbol is broken into a plurality of message blocks for measurement and it is determined that the patch site is within a first one of the message blocks. In this example, inputs to a hashing algorithm are chopped into fixed size blocks known as message blocks and fed to the hashing algorithm sequentially. For example, the message block sizes for SHA-256 and SHA-512 are 512 and 1024 bits respectively. Assuming that the device 220 is using SHA-512, it can group the state information into 1024 bit chunks and process the chunks sequentially to obtain the current measurement (hash).

The device 220 does the following to determine whether updates to kernel code are legitimate when current measurement deviates from the initial measurement. The device 220 repeats the hashing process for a message block but this time using the representation, it checks if a message block contains a valid patch site. If it contains a valid patch site, it looks at the address of the patch site.

In one example, the address is at a valid patch site. In this case, the device 220 verifies whether the current information at the address includes a valid update included in the representation of the jump table. As noted above, an example of a valid update is an option stored in the representation for the patch site.

In response to determining that a valid update occurred, the initial measurement for the symbol can be updated with the current measurement. In another example, the current instruction in the jump table corresponding to the address associated with the patch site can be updated to the current instruction or information at the location.

As noted, in this example, analysis of the symbol can be used instead of a direct comparison of reference information to current information. For example, the device 220 can determine that the symbol does not include a patch site based on the representation of the jump table (e.g., no valid jump table locations for the memory area covered by the symbol). In this scenario, the device 220 can determine that a potential violation is a violation.

In one example, the device 220 can determine that the symbol does include a patch site based on the representation. Responsive to the determination that the symbol does include a patch site based on the representation of the jump table, the device 220 determines whether a current instruction at the patch site corresponds to a measured instruction in the representation of the jump table.

Responsive to the determination that the current instruction at the patch site is different from a corresponding instruction for the patch site in the representation of the jump table, device 220 determines whether the current instruction is a valid potential instruction based on the representation. In one example, if the current instruction in the representation of the jump table for the patch site is different from a corresponding instruction for the patch site in the representation of the jump table, the device 220 makes a copy of the current instruction and overwrites the current instruction with the measured instruction in a copy of information contained at the first one symbol. The copy of the information is measured to determine a second current measurement. The second current measurement is compared to the initial measurement to determine that a valid update has occurred. In one example, the update is valid if the current instruction is stored as a potential valid instruction at the representation at the patch site and the second current measurement and the initial measurement match. In this scenario, the initial measurement can be updated with the current measurement. This is because a new baseline of what is valid can be made due to the update. Future comparisons for the symbol can be based on this new initial measurement. Moreover, the measured instruction can be updated with the current instruction in the representation of the jump table.

In some examples, the hash of any message block including a valid patch site is separately copied and the representation is enhanced with this information. In this example, options of each of the valid variations can also be hashed and that information kept in the representation.

In one example, options of each of the valid variations can also be hashed and that information can be kept with the representation. In this example, there is not a need to replace instructions and rehash. In this example, the device can replace the hash of the current valid block with a valid variation that is currently being implemented.

Figure 5:
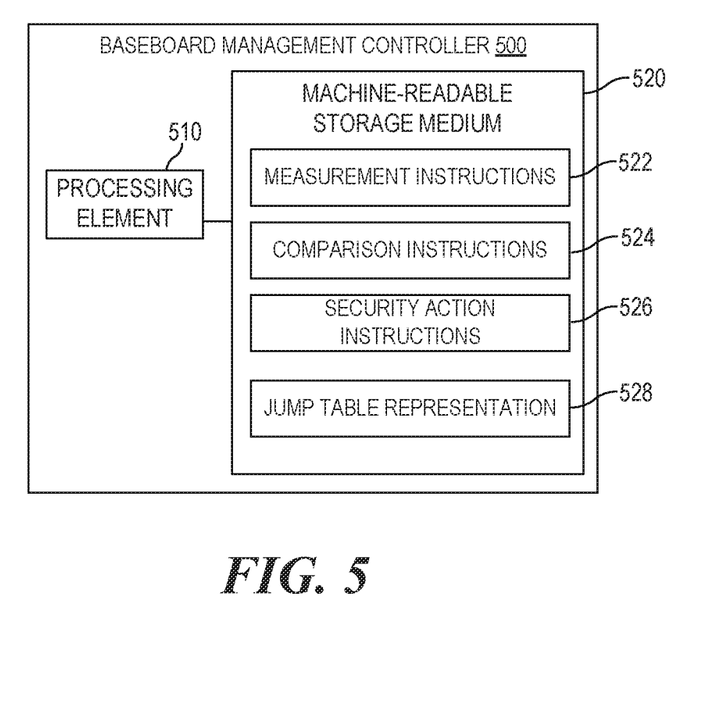
FIG. 5 is a block diagram of a baseboard management controller capable of measuring integrity of a computing system, according to an example.

FIG. 5 is a block diagram of a baseboard management controller capable of measuring integrity of a computing system, according to an example. As noted above, an implementation of device 200 can be BMC 500.

The BMC 500 can execute measurement instructions 522 to monitor the respective state information in the memory associated with each of the symbols for which an initial or baseline measurement was taken. The monitoring can be performed by measuring the state information corresponding to each of the symbols to determine a second set of measurements for the respective symbols. The processing element 510 can execute comparison instructions 524 to compare the second set of measurements with the initial or baseline measurements. The comparison can be one at a time (e.g., a current measurement of one symbol compared to the baseline or initial measurement for that symbol).

In some examples, the BMC 500 determines that there is a potential violation based on the comparison. This can occur if the comparison of two measurements for a symbol does not match. If there is a potential violation, the BMC may use a jump table representation 528 to determine whether the potential violation is a violation as described above. Further, if there is a potential violation that is not a violation, updates can be made to initial or baseline measurements to indicate that the current information is valid for future monitoring. Moreover, as noted above, the representation of the jump table 528 may be updated as well. In some examples, the representation of the jump table 528 may be in the form of a data structure, such as a red-black tree or other data structure that includes the information such as a linked list of arrays, one or more tables, etc.

Security action instructions 526 can be executed by processing element 510 in response to a determination of a violation. As noted above, the security action can include one or more of logging of the violation, sending an alert of the violation, shutting down of the computing system 200, re-initializing of the computing system, sending information to a SIEM, or other pre-determined action to remediate upon detection of the violation.

Processing element 510 may be, one or multiple semiconductor-based microprocessor, one or multiple graphics processing unit (GPU), other hardware devices suitable for retrieval and execution of instructions stored in machine-readable storage medium 520, or combinations thereof. The processing element 510 can be a physical device. Moreover, in one example, the processing element 510 may include multiple cores on a chip, include multiple cores across multiple chips, multiple cores across multiple devices (e.g., if the computing system 500 includes multiple node devices), or combinations thereof. Processing element 510 may fetch, decode, and execute instructions 522, 524, 526 to implement monitoring of symbols as well as other out of band activity. As an alternative or in addition to retrieving and executing instructions, processing element 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for monitoring symbols and performing security actions in response to detection of a violation.

A communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s). In some examples, the BMC 500, other device, or the respective computing system may be able to communicate, using a communication network to provide alerts, logging, etc. to an external entity (e.g., an external security unit or policy engine).

By way of example, computing systems communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

Figure 6:
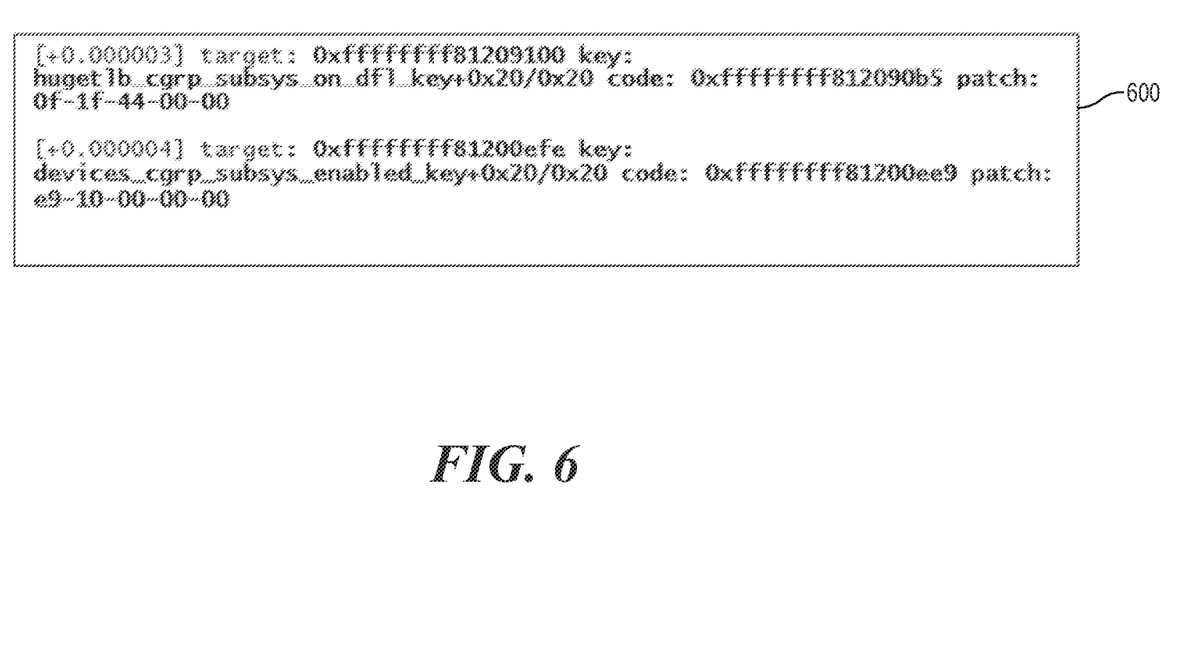
FIG. 6 is a diagram of an example of a jump table, according to an example.

FIG. 6 is a diagram of an example of a jump table, according to an example. The example illustrates an example of how the approaches used herein discriminate between legitimate and illegitimate kernel or module code changes by using an enhanced printout of a few lines of an actual kernel jump table. FIG. 6 shows this printout. In the figure, the name of the static key instead of just printing the raw address from the jump table. Additionally, the printout contents of the address (i.e. the patch instructions) are provided by the code field. Note that the actual jump table has code, target and key fields as shown in FIG. 6.

Line [+0.000003] in FIG. 6, shows that this kernel has a static key patch site located at address 0xffffffff812090b5 given by the code field. The current (patch) instruction at this address is 0f-1f-44-00-00, an x86 5-byte NOP. Recall that the code field is the address the kernel patches to enable and disable jumps to particular code (e.g., rarely used code). These are the lines that with NOP or JMP L in FIGS. 1B-1E. This implies that a patch address can contain a valid NOP, 0f-1f-44-00-00 in this example, or a valid JMP instruction. Any other update to kernel code is illegitimate and should be flagged by the scanning engine or device as a violation. Further, the valid updates allowed are from a valid NOP to a valid JMP or vice versa.

If the address contains a JMP instruction, we need to verify that the JMP actually jumps to a valid address i.e. a valid jump. Line [+0.000004] in FIG. 6, shows a patch site with patch instruction e9-10-00-00-00 which is an x86 JMP instruction. E9 is the opcode for JMP and the rest is a relative offset which is generally specified as a label in assembly code (L in FIG. 1C), but at the machine code level, it is encoded as a signed 8-, 16-, or 32-bit immediate value. This value is added to the value in an EIP Register. The EIP register contains the address of the instruction following the JMP instruction.

The kernel has a known fixed formula for determining the correct offset to use for each JMP instruction to make it land at the appropriate target address i.e. the address in the target field of the jump table entry. For Linux on x86, the offset for each JMP is given by: target−code+JUMP_LABEL_NOP_SIZE. JUMP_LABEL_NOP_SIZE is the size of the NOP instruction, which on x86 is 5 bytes. Using this formula the scanning engine or device can verify that the offset of a JUMP instruction is valid. Line [+0.000004] in FIG. 6 is valid, as target (0xffffffff81200efe) minus code (0xffffffff81200ee9) plus JUMP_LABEL_NOP_SIZE (5) is 0x10, the relative offset of the JMP instruction.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A method comprising:
   verifying trust in state information including a kernel code and a module code to load onto a computing system, wherein the state information corresponds to a plurality of symbols;

loading, by at least one processor of the computing system, the kernel code, the module code, and a jump table into a memory, wherein the memory is accessible by a device internal to the computing system and that is separate from the at least one processor, verifying and loading a measurement module into the memory;

measuring, by the measurement module after the measurement module is loaded and before loading a plurality of other modules, the state information corresponding to each of the plurality of symbols to generate a set of initial measurements;

providing the set of initial measurements associated with the plurality of symbols to the device for integrity monitoring;

providing a representation of the jump table to the device;

measuring, by the device, a first symbol of the plurality of symbols after the set of initial measurements is taken to generate a current measurement;

comparing the current measurement with a corresponding initial measurement of the first symbol to determine, based on a mismatch between the current measurement and the corresponding initial measurement, that a potential violation has occurred;

in response to detecting that an address associated with the mismatch is a valid patch site, determining whether an instruction at the address associated with the mismatch is different from a corresponding instruction provided in the representation of the jump table for the address; and determining whether the potential violation is a violation based on the device determining whether the instruction at the address associated with the mismatch is different from the corresponding instruction.

2. The method of claim 1, wherein the device is a baseboard management controller and wherein the jump table comprises entries identifying locations for instructions subject to change.

3. The method of claim 1, further comprising:
measuring, by the device, a second symbol of the plurality of symbols after the set of initial measurements is taken to generate a second current measurement;
comparing the second current measurement with a corresponding initial measurement of the second symbol to determine, based on a mismatch between the second current measurement and the corresponding initial measurement of the second symbol, that a second potential violation has occurred; and
determining, by the device, that the second potential violation is a violation in response to determining that the second symbol does not include a patch site based on the representation of the jump table.

4. The method of claim 1, wherein the corresponding instruction provided in the representation of the jump table for the address represents a valid instruction update.

5. The method of claim 4, comprising:
determining that the potential violation is not a violation and the instruction at the address is according to the valid instruction update responsive to determining that the instruction at the address matches the corresponding instruction provided in the representation of the jump table for the address.

6. The method of claim 1, wherein the representation of the jump table comprises a tree of nodes, and one or multiple valid potential instructions are included in respective nodes of the tree for the address.

7. The method of claim 1, comprising:
breaking the first symbol into a plurality of message blocks for measurement; and
determining that the valid patch site is within a first message block of the plurality of message blocks.

8. The method of claim 1, further comprising:
copying, by the device, a reference copy of the state information corresponding to the first symbol at a time of generating the corresponding initial measurement of the first symbol; and
using the reference copy to determine whether the potential violation is a violation.

9. The method of claim 4, wherein the representation of the jump table further specifies an offset with respect to which the corresponding instruction is applied.

10. The method of claim 1, wherein the measurement module is loaded into the memory during a boot of the kernel code.

11. A computing system comprising:
a system board including at least one processor, a memory coupled to the at least one processor, and a device separate from the at least one processor and capable of accessing the memory,
wherein the at least one processor is to:
load a kernel code, a module code, and a jump table into the memory, wherein the kernel code, the module code, and the jump table are part of state information corresponding to a plurality of symbols,
load a measurement module into the memory;
measure, using the measurement module, the state information corresponding to each of the plurality of symbols to generate respective initial measurements;
provide the respective initial measurements to the device for integrity monitoring;
determine a representation of the jump table; and
provide the representation of the jump table to the device,
wherein the device is to:
after the initial measurements are generated, measure a first symbol of the plurality of symbols to generate a current measurement;
compare the current measurement with a corresponding initial measurement of the first symbol to determine, based on a mismatch between the current measurement and the corresponding initial measurement, that a potential violation has occurred;
in response to detecting that an address associated with the mismatch is a valid patch site, determine whether an instruction at the address associated with the mismatch is different from a corresponding instruction provided in the representation of the jump table for the address; and
determine whether the potential violation is a violation based on the device determining whether the instruction at the address associated with the mismatch is different from the corresponding instruction.

12. The computing system of claim 11, wherein the device is further to:
measure a second symbol of the plurality of symbols after the initial measurements are generated to generate a second current measurement;
compare the second current measurement with a corresponding initial measurement of the second symbol to determine, based on a mismatch between the second current measurement and the corresponding initial measurement of the second symbol, that a second potential violation has occurred; and determine that the second potential violation is a violation in response to determining that the second symbol does not include a patch site based on the representation of the jump table.

13. The computing system of claim 11, wherein the corresponding instruction provided in the representation of the jump table for the address represents a valid instruction update.

14. The computing system of claim 11, wherein the jump table comprises entries identifying locations for instructions subject to change.

15. A non-transitory machine-readable storage medium comprising instructions that upon execution cause a computing system to:
load, using at least one processor of the computing system, a kernel code, a module code, and a jump table into a memory, wherein the memory is accessible by a device internal to the computing system and separate from the at least one processor, and wherein the kernel code and the module code are part of state information corresponding to a plurality of symbols;
load a measurement module into the memory;
measure, using the measurement module, the state information corresponding to each of the plurality of symbols to generate a set of initial measurements;
provide the set of initial measurements associated with the plurality of symbols to the device for integrity monitoring;
measure, using the device, a first symbol of the plurality of symbols after the set of initial measurements is generated to generate a current measurement;
compare the current measurement with a corresponding initial measurement of the first symbol to determine, based on a mismatch between the current measurement and the corresponding initial measurement, that a potential violation has occurred;
in response to detecting that an address associated with the mismatch is a valid patch site, determine whether an instruction at the address associated with the mismatch is different from a corresponding instruction provided in a representation of the jump table for the address; and
determine whether the potential violation is a violation based on the device determining whether the instruction at the address associated with the mismatch is different from the corresponding instruction.

16. The non-transitory machine-readable storage medium of claim 15, wherein the instructions upon execution cause the computing system to:
determine that the potential violation is not a violation and the instruction at the address is according to a valid instruction update responsive to determining that the instruction at the address matches the corresponding instruction provided in the representation of the jump table for the address.

* * * * *